United States Patent [19]

Fahy et al.

[11] 4,345,007

[45] Aug. 17, 1982

[54] ELECTRO-DEPOSITION OF A NONMAGNETIC CONDUCTIVE COATING FOR MEMORY WIRE PROTECTION

[75] Inventors: William J. Fahy, Oriskany; Fred E. Luborsky, Schenectady, both of N.Y.

[73] Assignee: General Electric Company, Utica, N.Y.

[21] Appl. No.: 834,019

[22] Filed: Sep. 16, 1977

Related U.S. Application Data

[63] Continuation of Ser. No. 641,457, Dec. 17, 1975, abandoned.

[51] Int. Cl.³ .............................................. B32B 15/00

[52] U.S. Cl. ...................................... 428/679; 204/40; 428/665; 428/680; 428/935

[58] Field of Search ................................ 427/127–132, 427/48; 428/900, 665, 457, 680, 935, 679; 204/40

[56] References Cited

U.S. PATENT DOCUMENTS

| | | | |
|---|---|---|---|
| 3,354,059 | 11/1967 | Koretzky | 204/43 T |
| 3,531,322 | 9/1970 | Kefalas et al. | 117/236 |
| 3,637,471 | 1/1972 | Faulkner | 204/43 P |
| 3,691,032 | 9/1972 | Luborsky et al. | 204/40 |
| 3,704,211 | 11/1972 | Phillips | 204/43 T |
| 4,108,739 | 8/1978 | Tadokoro et al. | 204/43 P |

*Primary Examiner*—Bernard D. Pianalto

[57] ABSTRACT

Plated memory wire is provided with a nickel-phosphorous alloy protective coating through an electro-deposition process. The protective coating is electrically conductive, nonmagnetic and has a bright surface amenable to good solder bonding. The memory function is provided by a Saccharin-type nickel-iron-cobalt film and the protective overcoating is applied by submerging the wire in an electrolyte bath composed of 360 g/l of nickel sulfate ($NiSO_4.6H_2O$), 80 g/l of sodium sulfate ($Na_2SO_4$), 60 g/l of sodium hypophosphite ($NaH_2PO_2.H_2O$) and 25 g/l of boric acid ($H_3BO_3$). The static bath is maintained at room temperature and the wire is moved through it at approximately eighteen inches per minute. An electro-deposition current density of from 20 to 80 ma./cm.$^2$ of plating area is employed.

5 Claims, 2 Drawing Figures

ELECTRO-DEPOSITION OF A NONMAGNETIC CONDUCTIVE COATING FOR MEMORY WIRE PROTECTION

This is a continuation of application Ser. No. 641,457, filed Dec. 17, 1975, and now abandoned.

BACKGROUND OF THE INVENTION

This invention relates to magnetic memory cell structures having a protective coating deposited over the magnetic surface and, more particularly, to memory cell structures of the type described wherein the protective coating is an electro-deposited layer of nonmagnetic nickel-phosphorous alloy.

Magnetic memory cells such as may be used with computer systems are often constructed of lengths of thin (e.g., 0.0025 inches) conductors having a magnetic surface. Information may be stored in such a memory cell by magnetic interaction set up at the intersection of the plated conductor with a second conductor sometimes referred to as a word strap. Coincident currents applied to the plated conductor and to the word strap results in the magnetic surface of the conductor in the area of the intersection being placed in a predetermined state of magnetization. To read information out of the memory cell, current is applied only to the word strap conductor and a readout current is induced on the plated memory cell conductor in accordance with the magnetization state of the magnetic coating.

Manufacture and assembly of plated wire memories of this type is an extremely delicate operation since the magnetic film provided on the wire is very thin (e.g. 4,000 to 6,000 A.U.) and soft and is highly susceptible to damage even when the most careful handling procedures are employed. Further, the magnetic coating, which may be a nickel-iron film deposited as set forth in U.S. Pat. No. 3,753,665 entitled "Magnetic Film Plated Wire", is also highly corrosive and is subject to rapid deterioration in a salt environment.

It has heretofore been the practice to make such plated wire more durable through the application of multiple layers of the magnetic material itself, or through application of an organic film or an electroless nickel alloy film over the basic magnetic layer. The use of multiple layers of the magnetic film is undesirable from the standpoint that it increases the cost of manufacture and, further, it does not resolve the corrosion problem. Organic protective layers involve the use of exotic and difficult to control deposition processes and further leave the wire with a nonconductive coating which prohibits use of on-line electrical testing techniques. Electroless films have the disadvantage of requiring high temperature application and also have undesirable magnetic properties which interfere with the basic operation of the memory cell itself.

OBJECTS AND SUMMARY OF THE INVENTION

It is therefore an object of the present invention to provide a magnetic memory cell having a protective overcoating which is both nonmagnetic and electrically conductive.

A further object is to provide a magnetic memory cell having a hard, noncorrosive protective coating which may be applied at room temperature and which is amenable to bonding through conventional soldering techniques.

In accordance with the invention, a plated memory wire is provided with an electro-deposited layer of nickel-phosphorous alloy. The protective alloy layer has a phosphorous content of approximately 15% and thus exhibits nonmagnetic properties while retaining good electrical conductivity. The layer is applied by submerging the wire in an electrolyte having a nickel ion to hypophosphite ion molar ratio of approximately three to one and a pH of between 2.5 and 3.75.

These and other objects, features and advantages will be made apparent by the following detailed description of a preferred embodiment of the invention, the description being supplemented by drawings as follows.

DETAILED DESCRIPTION OF EMBODIMENT

Figure 1:
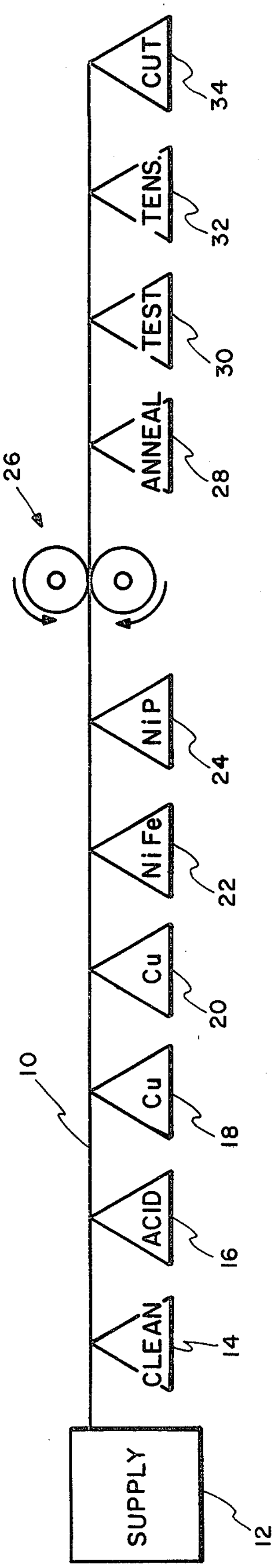
FIG. 1 is a schematic diagram showing the steps in the process for producing plated memory wire in accordance with a preferred embodiment of the invention.

Referring to FIG. 1, a wire 10 which may be, for example, a continuous strand of 2.5 mil tungsten or beryllium copper wire, is drawn by a pair of drive rolls 26 from a supply 12 through a series of six process stations 14, 16, 18, 20, 22 and 24. The wire is initially cleaned and etched at stations 14 and 16 and then is provided with a double layer of copper and a final layer of nickel-iron permalloy having magnetic properties as set forth in the previously mentioned U.S. Pat. No. 3,753,665. After the outer surface of magnetic material has been applied at station 22, the wire passes through a plating station 24 to receive a protective layer of nickel-phosphorous alloy applied in the manner hereinafter described.

After the wire has been provided with the protective coating, it passes between drive rolls 26 and thereafter is pushed through process stations 28, 30, 32 and 34. At station 28 the wire is annealed and stabilized in a manner which provides a predetermined circumferential orientation to the magnetic structure such that the wire is provided with a so-called "easy" magnetic axis. This is done by raising the temperature of the wire to a temperature on the order of 320 degrees C. while passing a current of predetermined magnitude through the wire in the presence of a magnetic bias field. At process station 30 the wire is subjected to electrical tests to determine its suitability for the intended magnetic memory cell application. To this end the wire passes through a set of mercury cups which enable appropriate test currents to be coupled through the wire.

Station 32 includes a tensioning apparatus which applies a minimum amount of tension to prevent the wire from sagging as it passes through stations 28 and 30. One suitable tensioning arrangement includes passing the wire through a tube which supports a flow of a glycerine-water liquid mixture which moves in the direction of the wire. The friction applied to the surface of the wire by the flow of liquid, which is maintained at an appropriate velocity through external pumping means, applies approximately 5 grams of tension which is sufficient to prevent sagging. Minimization of the tension applied at station 32 is necessary to alleviate as much stress as possible from the wire as it is being operated on at stations 28 and 30. It is for this reason that drive rolls 26 are positioned between stations 24 and 28 instead of at station 32. The final operation on the wire is performed at station 34 where it is cut into appropriate lengths.

Figure 2:
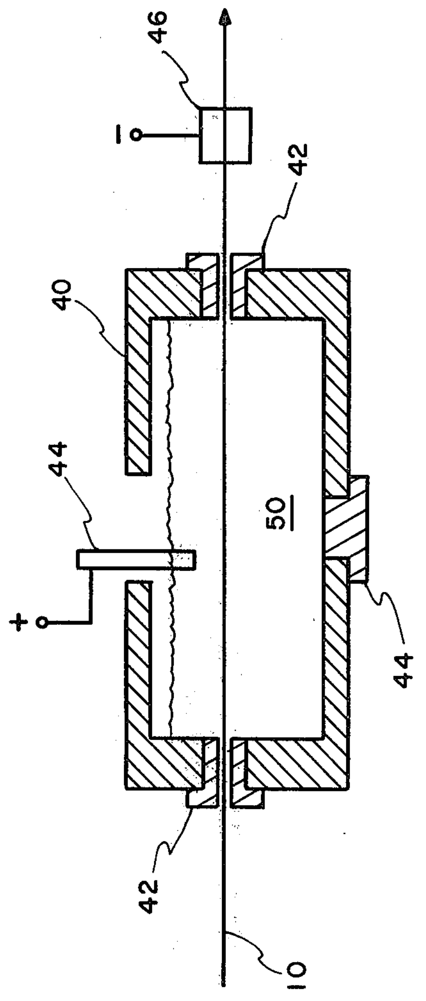
FIG. 2 is a schematic diagram illustrating a plating cell for applying the nickel-phosphorous coating to the wire in accordance with the invention.

The plating cell which applies the protective coating is shown in FIG. 2. The cell 40 includes a pair of split plugs 42 provided in opposite ends of the cell walls. The plugs serve to retain the electrolyte 50 within the cell while at the same time the openings in the plugs are sufficient to allow the passage of wire 10 with a narrow clearance, on the order of 2 mils, so that the magnetic surface on the wire is not disturbed as it passes through the cell. The minor amount of electrolyte leakage which occurs through the plugs does not effect the plating process.

The cell is of open construction and is maintained at room temperature, i.e., between 22 and 25 degrees C. An anode electrode 44 provides electrical contact between the electrolyte and the positive terminal of a D.C. power supply. Anode 44 may be, for example, a platinum strip which is inert with respect to the electrolytic process. A cathode electrode 46 may comprise, for example, a mercury cup for providing electrical connection between the wire 10 and the negative terminal of the power supply. Cathode 46 it should be noted is positioned on the downstream side of cell 40 such that the portion of the wire which contacts the cathode is protected with the nickel-phosphorous outer layer.

A preferred formulation for the electrolyte bath includes the following constituents:

| | | g/l | oz./gal |
|---|---|---|---|
| nickel sulfate | ($NiSO_4.6H_2O$) | 360 | 48 |
| sodium sulfate | ($Na_2SO_4$) | 80 | 9.6 |
| sodium hypophosphite | ($NaH_2PO_2.H_2O$) | 60 | 7.2 |
| boric acid | ($H_3BO_3$) | 25 | 2.4 |

The above electrolyte composition provides a nickel ion to hypophosphite ion molar ratio of approximately 3 to 1 and supplies the necessary chemical balance of available ions to sustain electrolysis. The electrolyte bath is a high sulphate bath and has a relatively low pH factor in the area of 3.1. It is preferable to make up a relatively large bath of electrolyte and, if necessary, adjust the pH by addition of quantities of sulphuric acid until the desired pH is obtained. While 3.1 has been found to produce results of good quality, a pH factor in the range of 2.5 to 3.75 is suitable. The above constituent formulation exhibits a nominal pH in the area of 3.0. After the batch of electrolyte has been mixed, the cell should be drained after each plating run of approximately 8 to 10 hours and supplied with fresh electrolyte. The electrolyte constituents should be in the form of conventional certified ACS reagent grade salts.

Some variation of the electrolyte bath formulation is permissible without loss of the desirable properties of the resultant coating. The nickel sulfate concentration can be dropped to as low as 270 g/l and raised to as high as 450 g/l. It is possible to reduce the sodium sulfate concentration to a very small amount or to raise it as high as 100 g/l. Sodium hypophosphite can be reduced to around 44 g/l and can be raised as high as 74 g/l. Boric acid can be varied between 10 and 30 g/l.

Moving the wire 10 through the plating cell 40 at approximately 18 inches per minute with the electrode voltage adjusted to supply a current density between 20 and 80 ma/cm$^2$ of plating area provides the desired nickel-phosphorous coating. Current density should be adjusted in accordance with the pH of the bath, lower pH factors requiring a higher current density. The surface of the coating has a bright appearance and is readily amenable to good solder bonding. The coating is electrically conductive and is nonmagnetic in that particles of the coating are not observed to fly to a magnet. The phosphorous content of the coating is approximately 15 percent. Alloy compositions having less than 8 percent phosphorous exhibit a dull surface quality and are magnetic. It is imperative that the chemistry of the electrolyte bath be maintained such that the phosphorous content of the electro-deposited alloy stays well above the 8 percent level, and, preferably remains around 10 to 15 percent.

Use of the electrolyte bath at room temperature results in a sound nickel-phosphorous deposit with little or no stressing observed to occur in the bath. The coating provides the wire and its sensitive nickel-iron magnetic layer substantial protection from handling damage and corrosive elements present in the environment in which it is used. It has been found, for example, that a plated memory wire having the protective coating is not damaged even when it is drawn over a sharp metallic blade. Further, a coated wire can withstand a 72 hour salt fog test conducted according to MIL STD 202 without noticeable adverse effects. The conductive properties of the coating readily permit on-line electrical testing such as performed at test station 30 (FIG. 1) which is highly desirable for efficient production of the memory wire. Further, the nonmagnetic properties of the coating not only do not interfere with the magnetic function of memory cells constructed with the wire but some evidence has been observed which actually demonstrates an increase in the signal response characteristics of the wire due to the coating. Plating efficiency on the order of 80% or better is achieved at room temperature with the above-described process.

The following are examples of alternate electrolyte formulations having the necessary 3 to 1 nickel ion-hypophosphite ion molar ratio which have been observed to produce a nickel-phosphorous coating having the desirable characteristics heretofore described:

| | Nominal concentration |
|---|---|
| Example 1: | |
| Nickel sulfate | 360 g/l |
| Sodium hypophosphite | 60 g/l |
| Boric acid | 12.5 g/l |
| Sodium saccharin | 50 mg/l |
| Example 2: | |
| Nickel sulfate | 360 g/l |
| Sodium hypophosphite | 60 g/l |
| Boric acid | 25 g/l |
| Sulphuric acid | 32 g/l |
| Example 3: | |
| Nickel sulfate | 360 g/l |
| Sodium hypophosphite | 60 g/l |
| Boric Acid | 12.5 g/l |
| Triethanolanine | 2.5 ml/l |
| Sodium saccharin | 50 mg/l |

It will be appreciated that various additional changes in the form and details of the above-described preferred embodiment may be effected by persons of ordinary skill without departing from the true spirit and scope of the invention.

We claim:

1. A memory cell comprising:

a metallic substrate;

a magnetic material comprising a nickel-iron permalloy deposited on the surface of said substrate, and an essentially sound and unstressed layer of electrically conductive nonmagnetic nickel-phosphorous alloy deposited on the surface of said magnetic material and having a phosphorous content between 8 and 15 percent;

made by the process which includes passing said substrate at a speed of approximately 18 inches per minute with said magnetic material deposited thereon through a plating cell having a high sulphate electrolyte with a pH in the range of 2.5 to 3.75 maintained at substantially room temperature, said electrolyte having a nickel ion to hypophosphate ion molar ratio of substantially 3 to 1, an anode disposed in the electrolyte and electrically coupled to the positive terminal of a DC power supply, said DC power supply being adjusted to supply a current density in the range of 20 through 80 milliamps per square centimeter of plating area, a cathode in electrical and mechanical contact with said passing memory cell and electrically coupled to the negative terminal of said DC power supply.

2. A cell according to claim 1 wherein:

said electrolyte comprises substantially $NiSO_4.6H_2O$ in a concentration of 360 g/l, $Na_2SO_4$ in a concentration of 80 g/l, $NaH_2PO_2.H_2O$ in a concentration of 60 g/l, and $H_3BO_3$ in a concentration of 25 g/l.

3. A cell according to claim 1 wherein:

said electrolyte comprises substantially;

Nickel sulfate in a concentration of 360 g/l,

Sodium hypophosphate in a concentration of 60 g/l

Boric acid in a concentration of 12.5 g/l,

Sodium saccharin in a concentration of 50 mg/l.

4. A cell according to claim 1 wherein:

said electrolyte comprises substantially;

Nickel sulfate in a concentration of 360 g/l,

Sodium hypophosphite in a concentration of 60 g/l,

Boric acid in a concentration of 25 g/l,

Sulphuric acid in a concentration of 32 g/l.

5. A cell according to claim 1 wherein:

said electrolyte comprises substantially;

Nickel sulfate in a concentration of 360 g/l,

Sodium hypophosphite in a concentration of 60 g/l,

Boric acid in a concentration of 12.5 g/l,

Triethanolanine in a concentration of 2.5 ml/l,

Sodium saccharin in a concentration of 50 mg/l.

* * * * *